United States Patent Office 2,855,405
Patented Oct. 7, 1958

2,855,405

2 - (N-ALKYLAMINOMETHYL) - BICYCLO - (2,2,1) - 5-HEPTENES AND 2-(N-ALKYLAMINOMETHYL)-BICYCLO-(2,2,1)-HEPTANES

Joseph Nichols, Princeton, N. J., assignor to Ethicon, Inc., a corporation of New Jersey No Drawing. Application December 3, 1954
Serial No. 473,055

6 Claims. (Cl. 260—343.7)

The present invention relates to a new group of secondary amines of the following general structure:

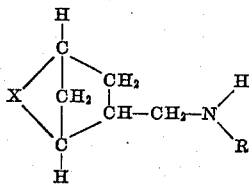

and salts thereof wherein X is an ethylene or vinylene group and R is a straight-chained or branch-chained aliphatic radical having five to sixteen carbon atoms such as amyl, hexyl, heptyl, decyl, dodecyl, and hexadecyl radicals.

The novel secondary amines of this invention in which X is a vinylene group may be prepared by heating a mixture of 2-(bromomethyl)-bicyclo-(2,2,1)-5-heptene and an aliphatic amine. The secondary amines in which X is an ethylene group may be prepared by reduction of the secondary amines in which X is a vinylene group. A method for the preparation of 2-(bromomethyl)-bicyclo-(2,2,1)-5-heptene is described in U. S. Patent No. 2,352,606. 2-(bromomethyl)-bicyclo-(2,2,1)-5-heptene or secondary amines derived therefrom may be catalytically reduced to provide 2-(bromomethyl)-bicyclo-(2,2,1)-5-heptane or the corresponding secondary amines. It is preferable that an excess of the amine be employed or that pyridine be present in the reaction mixture in order that liberated hydrobromic acid may be removed by salt formation. An inert organic solvent may also be present in the reaction mixtures and this is particularly desirable if the amine is of low molecular weight. The novel secondary amines may be isolated from a reaction mixture which has been heated until the reaction is complete by adding an aqueous sodium hydroxide solution followed by extraction with ether, removal of the ether under reduced pressure from the dried ether solution and distillation of the residue.

The novel secondary amines described herein readily form salts with a variety of inorganic and organic acids including sulfuric, phosphoric, hydrochloric, hydrobromic, hydriodic, citric, lactic, maleic, succinic, tartaric, cinnamic, acetic, benzoic, oxalic, ascorbic, and related acids. The hydrochloride salts of the amines may be prepared by dissolving the amine in ether or petroleum ether and passing gaseous hydrochloric acid through the solution. The precipitated amine hydrochloride which has been removed by filtration and dried, may be recrystallized.

The following examples illustrate the preparation of specific secondary amines of the invention and are set forth for purposes of illustration but are not to be construed as limiting the spirit of the invention or its scope. It will be apparent to those skilled in the art that many modifications in materials and conditions of reaction as well as methods of preparation may be adopted without departing from the scope of the invention.

EXAMPLE I 2-(n-amylaminomethyl)-bicyclo-(2,2,1)-5-heptene hydrochloride 54.2 grams of freshly distilled amylamine were mixed with 56.1 grams of 2-(bromomethyl)-bicyclo-(2,2,1)-5-heptene and heated at 170° C. for fifteen hours in a sealed tube. The solid reaction mixture was treated with an excess of 50 percent aqueous sodium hydroxide solution and the two phase liquid mixture obtained was extracted three times with ether. The ether extracts were combined and dried over potassium hydroxide, filtered, and the ether was removed on a steam bath. The residue was distilled and 26.1 grams of 2-(n-amyl-aminomethyl)-bicyclo-(2,2,1)-5-heptene having a boiling point of 116–119° C. at a pressure of 9 mm. of mercury and a refractive index of 1.4768 at 26° C. were obtained. Gaseous hydrogen chloride was passed through an ether solution of the distillate and the precipitated hydrochloride of the secondary amine was recrystallized from ethyl acetate and then from benzene. The hydrochloride had a melting point of 262–264° C.

Calculated for $C_{13}H_{24}NCl$: Carbon=67.95; hydrogen=10.53. Found: Carbon=67.66; hydrogen=10.57.

EXAMPLE II 2-(n-hexylaminomethyl)-bicyclo-(2,2,1)-5-heptene hydrochloride

A mixture of 50.5 grams of freshly distilled hexylamine and 46.8 grams of 2-(bromomethyl)-bicyclo-(2,2,1)-5-heptene was mixed and heated in a sealed tube for sixteen hours at 170–175° C. The solid material obtained was treated with an excess of 50 percent aqueous sodium hydroxide solution and the two phase liquid mixture obtained was extracted three times with ether. The ether extracts were combined and dried over potassium hydroxide, filtered, and solvent was removed on steam bath. Distillation of the residue provided 23.9 grams of 2-(n-hexylaminomethyl)-bicyclo-(2,2,1)-5-heptene having a boiling point of 127–131° C. at a pressure of 9 mm. of mercury and a refractive index of 1.4762 at 28° C. The hydrochloride of the secondary amine was prepared by passing gaseous hydrogen chloride through the ether solution and the precipitated hydrochloride of the secondary amine was recrystallized from ethyl acetate and then from benzene. The recrystallized material had a melting point of 240–242° C.

Calculated for $C_{14}H_{26}NCl$: Carbon=68.96; hydrogen=10.75. Found: Carbon=69.02; hydrogen=10.55.

EXAMPLE III 2-(n-heptylaminomethyl)-bicyclo-(2,2,1)-5-heptene hydrochloride

A mixture of 47 grams of freshly distilled normal heptylamine and 38.1 grams of 2-(bromomethyl)-bicyclo-(2,2,1)-5-heptene were refluxed for sixteen hours at 160–165° C. The solid reaction product was treated with an excess of 50 percent aqueous sodium hydroxide solution and the two phase liquid mixture obtained was extracted three times with ether. The ether layers were combined and dried over potassium hydroxide, filtered, and the solvent was removed on a steam bath. Distillation of the residue provided 22.4 grams of 2-(n-heptyl-aminomethyl)-bicyclo-(2,2,1)-5-heptene having a boiling point of 152° C. at a pressure of 13 mm. of mercury and a refractive index of 1.4764 at 28° C. The hydrochloride of the secondary amine, obtained by passing gaseous hydrogen chloride through an ether solution of the distillate, was crystallized three times from acetone, and the recrystallized material had a melting point of 212–213° C.

Calculated for $C_{15}H_{27}NCl$: Carbon=69.87; hydrogen=10.95. Found: Carbon=70.23; hydrogen=10.83.

EXAMPLE IV

2-(n-octylaminomethyl)-bicyclo-(2,2,1)-5-heptene hydrochloride

A mixture of 77.7 grams of freshly distilled normal octylamine and 56.1 grams of 2-(bromomethyl)-bicyclo-(2,2,1)-5-heptene was refluxed for fifteen hours at 150–160° C. The reaction mixture was cooled and treated with an excess of 50 percent aqueous sodium hydroxide solution and the two phase liquid mixture obtained was extracted three times with ether. The ether layers were combined and dried over potassium hydroxide, filtered, and the solvent was removed on a steam bath. Distillation of the residue provided 47.5 grams of 2-(n-octylaminomethyl)-bicyclo-(2,2,1)-5-heptene having a boiling point of 157–167° C. at a pressure of 9 mm. of mercury. Redistillation provided 33.7 grams of the secondary amine having a boiling point of 162–165° C. at a pressure of 9 mm. of mercury and a refractive index of 1.4752 at 23° C. The hydrochloride of the secondary amine, obtained by passing gaseous hydrogen chloride through an ether solution of the distillate, was crystallized from ethyl acetate and subsequently from benzene and had a melting point of 205–206° C.

Calculated for $C_{16}H_{30}NCl$: Carbon=70.68; hydrogen=11.13. Found: Carbon=70.96; hydrogen=11.21.

EXAMPLE V

2-(1,1,3,3-tetramethylbutylaminomethyl)-bicyclo-(2,2,1)-5-heptene hydrochloride A mixture of 46 grams of tertiary octylamine and 32 grams of 2-(bromomethyl)-bicyclo-(2,2,1)-5-heptene was heated for 30 hours at 170–175° C. in a sealed tube. The contents of the tube were cooled and treated with an excess of 50 percent aqueous sodium hydroxide. The two phase liquid mixture obtained was extracted three times with ether and the combined ether extracts were dried over potassium hydroxide and filtered. After removal of the solvent on a steam bath, the residue was distilled and the 2-(1,1,3,3-tetramethylbutylaminomethyl)-bicyclo-(2,2,1)-5-heptene obtained by distillation of the residue had a boiling point of 143–146° C. at 13 mm. of mercury pressure, and a refractive index of 1.4791 at 27.5° C. The hydrochloride of the secondary amine was obtained by passing gaseous hydrogen chloride through an ether solution of the distillate and following recrystallization from an ethyl acetate-benzene mixture, had a melting point of 262–263° C.

Calculated for $C_{16}H_{30}NCl$: Carbon=70.68; hydrogen=11.13. Found: Carbon=70.79; hydrogen=10.83.

EXAMPLE VI

2-(n-nonylaminomethyl)-bicyclo-(2,2,1)-5-heptene hydrochloride

A mixture of 22.2 grams of freshly distilled nonylamine and 28.1 grams of 2-(bromomethyl)-bicyclo-(2,2,1)-5-heptene, and 15 cc. of pyridine was heated for eighteen hours at 160–165° C. The reaction mixture was cooled and treated with an excess of 50 percent aqueous sodium hydroxide solution. The two phase liquid mixture obtained was extracted three times with ether and the combined ether layers were dried over potassium hydroxide and filtered. After removal of the solvent on a steam bath, 2-(n-nonylaminomethyl)-bicyclo-(2,2,1)-5-heptene was obtained by distillation of the residue and had a boiling point of 182–187° C. at a pressure of 14 mm. of mercury. The product was redistilled and 9.6 grams were obtained at a temperature of 132–135° C. and a pressure of 0.1 mm. of mercury. The hydrochloride of the secondary amine, obtained by passing gaseous hydrogen chloride through an ether solution of distillate, was recrystallized from an ethyl acetate-benzene mixture and then from an acetone-benzene mixture and had a melting point after the second crystallization of 211–212° C.

Calculated for $C_{17}H_{32}NCl$: Carbon=71.41; hydrogen=11.29. Found: Carbon=71.52; hydrogen=11.19.

EXAMPLE VII

2-(n-decylaminomethyl)-bicyclo-(2,2,1)-5-heptene hydrochloride

A mixture of 63.2 grams of freshly distilled decylamine and 37.4 grams of 2-(bromomethyl)-bicyclo-(2,2,1)-5-heptene was heated for twenty hours at 160–170° C. The reaction mixture was cooled and treated with an excess of 50 percent sodium hydroxide solution. The resulting two phase liquid mixture was extracted three times with ether and the combined ether layers were dried over potassium hydroxide and filtered. The residue, after removal of the solvent on a steam bath was distilled and 33.5 grams of 2-(n-decylaminomethyl)-bicyclo-(2,2,1)-5-heptene, having a boiling point of 181–186° C. at 9 mm. of mercury were obtained. The distillate was redistilled and 25.5 grams of secondary amine having a boiling point of 135–140° C. at a pressure of 0.04 mm. of mercury, and a refractive index of 1.4738 at 29.5° C. were obtained. The hydrochloride of the product obtained by passing gaseous hydrogen chloride through an ether solution of the distillate was crystallized three times from ethyl acetate and had a melting point of 215–216° C.

Calculated for $C_{18}H_{34}NCl$: Carbon=72.08; hydrogen=11.43. Found: Carbon=72.29; hydrogen=11.10.

EXAMPLE VIII

2-(n-undecylaminomethyl)-bicyclo-(2,2,1)-5-heptene hydrochloride

A mixture of 22.8 grams of freshly distilled normal undecylamine and 24.5 grams of 2-(bromomethyl)-bicyclo-(2,2,1)-5-heptene hydrochloride and 12 cc. of pyridine was heated for fifteen hours at 160–165° C. The reaction mixture was cooled and treated with an excess of 50 percent aqueous sodium hydroxide solution, and extracted three times with ether. The ether extracts were combined and dried over potassium hydroxide and filtered. The residue, after removal of the solvent on a steam bath was distilled and 16.4 grams of 2-(n-undecylaminomethyl)-bicyclo-(2,2,1)-5-heptene, having a boiling point of 155–160° C. at a pressure of 1 mm. of mercury were obtained. The distillate was redistilled and 13.5 grams of secondary amine having a boiling point of 152–156° C. at a pressure of 0.5 mm. of mercury were obtained. The hydrochloride of the secondary amine, obtained by passing a gaseous hydrogen chloride through an ether solution of distillate, was recrystallized from ethyl acetate and then from acetone. The melting point of the product obtained by the second crystallization was 208–209° C.

Calculated for $C_{19}H_{36}NCl$: Carbon=72.69; hydrogen=11.56. Found: Carbon=72.79; hydrogen=11.39.

EXAMPLE IX

2-(n-tetradecylaminomethyl)-bicyclo-(2,2,1)-5-heptene hydrochloride

A mixture of 85.2 grams of tetradecyl amine and 37.4 grams of 2-(bromomethyl)-bicyclo-(2,2,1)-5-heptene was heated at 160–170° C. for forty hours. The reaction mixture was cooled and treated with an excess of 50 percent aqueous sodium hydroxide solution and the two phase liquid mixture was extracted three times with ether. The ether extracts were combined and dried over potassium hydroxide, filtered, and the solvent was removed on a steam bath. The residue was distilled and 18.0 grams of 2-(n-tetradecylaminomethyl)-bicyclo-(2,2,1,)-5-heptene, having a boiling point of 166–172° C. at a pressure of 0.08 mm. of mercury, were obtained. The hydrochloride of the secondary amine, obtained by passing gaseous hydrogen chloride through an ether solution of the distillate, had a melting point of 212–214° C.

Calculated for $C_{22}H_{42}NCl$: Carbon=74.21; hydrogen=11.89. Found: Carbon=74.01; hydrogen=12.04.

EXAMPLE X

*2-(n-hexadecylaminomethyl)-bicyclo-(2,2,1)-5-heptene hydrochloride*

A mixture of 88.6 grams of freshly distilled normal hexadecylamine and 34.3 grams of 2-(bromomethyl)-bicyclo-(2,2,1)-5-heptene was heated for fifteen hours at 160–165° C. The reaction mixture was cooled and treated with an excess of 50 percent aqueous sodium hydroxide solution and extracted three times with ether. The ether extracts were combined, dried over potassium hydroxide, filtered, and the solvent was removed on a steam bath. The residue was distilled and 27.8 grams of 2 - (n - hexadecylaminomethyl) - bicyclo - (2,2,1) - 5-heptene, having a boiling point of 178–185° C. at a pressure of 0.08 mm. of mercury and a refractive index of 1.4736 at 26° C., were obtained. The hydrochloride of the secondary amine, obtained by passing gaseous hydrogen chloride through an ether solution of the distillate, was recrystallized from acetone and then from an acetone-benzene mixture. The crystalline material obtained from the second crystallization had a melting point of 199–200° C.

Calculated for $C_{14}H_{46}NCl$: Carbon=75.05; hydrogen=12.07. Found: Carbon=75.35; hydrogen=12.04.

EXAMPLE XI

*2-(n-dodecylaminomethyl)-bicyclo-(2,2,1)-5-heptene and hydrochloride thereof*

A mixture of 92.5 grams of lauryl amine and 47 grams of 2 - (bromomethyl) - bicyclo - (2,2,1) - 5 - heptene were heated at a temperature of 150–160° C. for twenty hours. The reaction mixture solidified on cooling and was dissolved in 240 cc. of fifty percent aqueous sodium hydroxide solution and the solution was extracted three times with ether. The ether extracts were combined and dried over potassium hydroxide, and filtered. The solvent was removed on a steam bath and distillation of the residue provided 50.9 grams of 2-(n-dodecylaminomethyl)-bicyclo-(2,2,1)-5-heptene having a boiling point of 139–144° C. at a pressure of 0.06 mm. of mercury and a refractive index of 1.4723 at 27.5° C. The hydrochloride of the secondary amine, obtained by passing gaseous hydrogen chloride through an ether solution of the distillate, was crystallized three times from water and the crystalline material had a melting point of 203–205° C.

Calculated for $C_{20}H_{38}NCl$: Carbon=73.23; hydrogen=11.68. Found: Carbon=73.00; hydrogen=11.55.

EXAMPLE XII

*2-(n-dodecylaminomethyl)-bicyclo-(2,2,1)-5-heptene ascorbate*

25 grams of distilled 2-(n-dodecylaminomethyl)-bicyclo-(2,2,1)-5-heptene, was added to an equi-molar amount of ascorbic acid in solution in 200 cc. of distilled water. The secondary amine dissolved rapidly in the acid solution and the salt formed was obtained by removal of the water under reduced pressure.

EXAMPLE XIII

*2-(n-dodecylaminomethyl)-bicyclo-(2,2,1)-heptane and hydrochloride thereof*

10.6 grams of 2-(n-dodecylaminomethyl)-bicyclo-(2,2,1)-5-heptene were dissolved in fifty cc. of absolute alcohol. 0.2 gram of platinum oxide was added to the alcohol solution and the secondary amine was hydrogenated under pressure. When hydrogenation was complete the solution was filtered and the alcohol was removed under reduced pressure. Distillation of the residue provided 8.0 grams of 2-(n-dodecylaminomethyl)-bicyclo-(2,2,1)-heptane having a boiling point of 132–134° C. at a pressure of 0.05 mm. of mercury. The hydrochloride of the secondary amine, obtained by passing gaseous hydrogen chloride through an ether solution of the distillate, was crystallized from ethyl acetate and the crystalline material had a melting point of 212–213° C.

Calculated for $C_{20}H_{40}NCl$: Carbon=72.79; hydrogen=12.22. Found: Carbon=72.92; hydrogen=12.13.

EXAMPLE XIV

The novel compounds of this invention were tested for bactericidal activity in some instances by a gradient plate method and in others by a serial dilution method.

The following gradient plate procedure was used: Sterile brain-heart infusion agar was poured into Petri plates 10 centimeters in diameter and allowed to harden, the plates being slanted so that the hardened agar increased in thickness from one side of a plate to the other. The plates were placed in a horizontal position and a second portion, equal in amount to the first portion, of a sterile brain-heart infusion agar containing the compound to be tested in a concentration of one milligram per milliliter of agar was poured into each plate and allowed to harden. The agar was streaked one and one-half centimeters from each side of each plate and parallel with the increasing concentration of the test compound in the agar with an aqueous dilution of a 24-hour broth culture of *Bacillus subtilis, Diplococcus pneumoniae* III, and *Micrococcus pyogenes* var. *aureus*, the broth culture of the *Bacillus subtilis* being diluted 1 to 10 with distilled water and the broth cultures of *Diplococcus pneumoniae* III and *Micrococcus pyogenes* var. *aureus* being diluted 1 to 100 with distilled water. The streaked agar was incubated at 27° C. for 34 hours and observed for growth or inhibition of growth of the test organism. The table below gives the results of the tests in Column I.

The following serial dilution procedure was used in determining bactericidal activity:

2 - (N - dodecylaminomethyl) - bicyclo - (2,2,1) - 5-heptene hydrochloride and 2-(N-dodecylaminomethyl)-bicyclo-(2,2,1)-5-heptene ascorbate were sterilized by exposure to propylene oxide for three days and 0.5 milliliter of sterile aqueous solution containing twenty micrograms of compound per milliliter of solution was added to 9.5 milliliters of sterile yeast beef broth, the broth then being serially diluted with additional sterile broth to provide solutions of five milliliters total volume containing 100, 50, 10, 1, 0.1 and 0.01 micrograms of compound per milliliter of solution. Three tubes, each containing 4.5 milliliters of sterile broth, were inoculated with 0.1 milliliter of a mature broth culture of *Bacillus subtilis, Diplococcus pneumoniae* III, and *Micrococcus pyogenes* var. *aureus*, respectively, and the inoculated tubes were incubated at 37° C. for 24 hours. Three tubes, each containing 4.5 milliliters of sterile broth, were each inoculated with 0.1 milliliter of an incubated culture and incubated at 37° C. for 24 hours. Progressive series of dilutions ranging from 1 to 100, to 1 to 1 billion, were prepared by dilution of the contents of the three tubes with sterile broth and 0.1 milliliter of each dilution was transferred into 4.5 milliliters of sterile broth and incubated at 37° C. for 24 hours. 0.1 milliliter of the contents of the tubes representing the highest dilution which initiated growth of the organism were each transferred into each of the tubes containing the compounds to be tested and this was followed by incubation of the tubes at 37° C. for 48 hours. The last two rows of the table below give the results of the tests by serial dilution in Column I, the values being the concentrations in micrograms per milliliter at which growth was inhibited.

The novel compounds of this invention were tested for activity against *Mycobacteria tuberculosis* H37Rv according to the method of A. W. Frisch and M. S. Tarshis, American Review of Tuberculosis, vol. 64, page 551

(1951). The table below gives the results of the activity of the novel compounds against *Mycobacteria tuberculosis* H37Rv in Column II, inhibiting concentrations being expressed in micrograms per milliliter.

The novel compounds of this invention were tested for activity against *Candida albicans* by a serial dilution method given by the following procedure:

The compounds to be tested were sterilized by exposure to propylene oxide for three days and 0.25 milliliter of sterile aqueous solution containing twenty micrograms of compound per milliliter of solution was added to 4.5 milliliters of sterile mycophil broth, the broth then being serially diluted with additional sterile broth to provide solutions of five milliliters total volume containing 500, 100, 10, 1, 0.1, and 0.01 micrograms of compound per milliliter of solution. One milliliter of a seventy-two hour Mycophil broth culture of *Candida albicans* was added to ninety-nine milliliters of sterile Mycophil broth and 0.2 milliliter of diluted culture was added to each of the serial dilutions containing the test compound and the inoculated tubes were incubated at 25° C. for five days. The table below gives the results of the tests in Column III, inhibiting concentrations being expressed in micrograms per milliliter.

lected from the class consisting of those having the structural formula

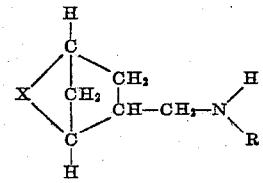

wherein X is selected from the group consisting of ethylene and vinylene radicals and R is an unsubstituted alkyl radical having at least five and not more than sixteen carbon atoms, and non-toxic acid addition salts thereof.

2. 2 - (N - dodecylaminomethyl) - bicyclo - (2,2,1)-5-heptene ascorbate.

3. 2 - (N - n - octylaminomethyl) - bicyclo - (2,2,1)-5-heptene hydrochloride.

4. 2 - (N - decylaminomethyl) - bicyclo - (2,2,1) - 5-heptene hydrochloride.

5. 2 - (N - undecylaminomethyl) - bicyclo - (2,2,1) - 5-heptene hydrochloride.

6. 2 - (N - dodecylaminomethyl) - bicyclo - (2,2,1)-heptane hydrochloride.

|  | Column I | | | Column II | Column III |
|---|---|---|---|---|---|
|  | Bacterial Inhibiting Activity | | | Mycobacterial Inhibiting Concentration | Fungal Inhibiting Concentration |
|  | B. Subtilis | D. Pneumoniae III | M. Pyogenes var. aureus | Mycobacterium tuberculosis H37Rv | Candida albicans |
| 2-(N-Heptylaminomethyl)-bicyclo-(2,2,1)-5-heptene hydrochloride. | Complete Inhibition. | Complete Inhibition. | Complete Inhibition. | 0.1 | 100–500 |
| 2-(N-n-Octylaminomethyl)-bicyclo-(2,2,1)-5-heptene hydrochloride. | do | do | do | 0.1 | 10–100 |
| 2-(N - Nonylaminomethyl) - bicylo -(2,2,1)-5-heptene hydrochloride. | do | do | do | 10 | 100 |
| 2-(N-Decylaminomethyl)-bicyclo-(2,2,1)-5-heptene hydrochloride. | do | do | do | 10 | 10 |
| 2-(N - Undecylaminomethyl) - bicyclo-(2,2,1)-5-heptenehydrochloride. | do | do | do | 10 | 10 |
| 2-(N-Dodecylaminomethyl)-bicyclo-(2,2,1)-heptane hydrochloride. | do | do | do | 0.1 | 0.1 |
| 2-(N-Tetradecylaminomethyl)-bicyclo-(2,2,1)-5-heptene hydrochloride. | do | do | do | 10 | 100 |
| 2-N-Hexadeclaminomethyl)-bicyclo-(2,2,1)-5-heptene hydrochloride. | do | do | do | 100 | 500 |
| 2-(N-dodecylaminomethyl)-bicyclo-(2,2,1) - 5 - heptene hydrochloride. | 10 | 10 | 10 | 1 |  |
| 2-(N-dodecylaminomethyl)-bicyclo-(2,2,1)-5-heptene ascorbate. | 10 | 1 | 10 | 1 | 10 |

It is to be understood that the invention is not to be limited to the specific examples which have been offered merely as illustrations, since other derivatives may be prepared, and that modifications may be made without departing from the spirit of the invention which is limited only by the appended claims.

What is claimed is:

1. As new chemical compounds, secondary amines se-

References Cited in the file of this patent

UNITED STATES PATENTS 2,415,453     Thomas _____ Feb. 11, 1947

OTHER REFERENCES

Alder et al.: "Berichte" (1938), vol. 718, pp. 1939–44.
Elsevier's Encyclopaedia (1948), vol. 12A, page 602.
Beilstein, vol. 12 (2nd Supp.), page 34 (1950).